(12) United States Patent  
Tsai et al.

(10) Patent No.: US 10,345,691 B2  
(45) Date of Patent: Jul. 9, 2019

(54) LENS DRIVING MECHANISM AND RELATED CAMERA DEVICE

(71) Applicant: VIVOTEK INC., New Taipei (TW)

(72) Inventors: Chiung-Wei Tsai, New Taipei (TW); Fang-Tzu Chang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 16/105,980

(22) Filed: Aug. 21, 2018

(65) Prior Publication Data  
US 2019/0086789 A1    Mar. 21, 2019

(30) Foreign Application Priority Data

Sep. 19, 2017    (TW) .............................. 106132020 A

(51) Int. Cl.  
G03B 37/04    (2006.01)  
G03B 17/08    (2006.01)  
G03B 17/12    (2006.01)

(52) U.S. Cl.  
CPC ............. *G03B 37/04* (2013.01); *G03B 17/08* (2013.01); *G03B 17/12* (2013.01)

(58) Field of Classification Search  
None  
See application file for complete search history.

(56) References Cited

U.S. PATENT DOCUMENTS

| | | | |
|---|---|---|---|
| 2,068,410 A * | 1/1937 | Hanke | G03B 37/04 352/69 |
| 9,921,464 B1 * | 3/2018 | Choi | G02B 27/64 |
| 2006/0115265 A1 * | 6/2006 | Elberbaum | F16M 11/18 396/427 |
| 2006/0139475 A1 * | 6/2006 | Esch | G03B 37/04 348/340 |
| 2010/0097443 A1 * | 4/2010 | Lablans | G03B 37/00 348/36 |
| 2010/0097444 A1 * | 4/2010 | Lablans | G03B 35/00 348/46 |
| 2015/0264232 A1 * | 9/2015 | Yang | H04N 5/2254 348/373 |
| 2015/0341617 A1 * | 11/2015 | Cole | G03B 17/561 348/36 |
| 2017/0329111 A1 * | 11/2017 | Hu | H02K 41/0356 |
| 2018/0063429 A1 * | 3/2018 | Enriquez | H04N 5/23238 |
| 2018/0210322 A1 * | 7/2018 | Malukhin | G03B 17/561 |
| 2019/0086789 A1 * | 3/2019 | Tsai | G03B 37/04 |

* cited by examiner

*Primary Examiner* — William B Perkey  
(74) *Attorney, Agent, or Firm* — Winston Hsu

(57) ABSTRACT

A camera device includes a supporter, a plurality of camera units, a cover and a lens driving mechanism. The camera units are movably disposed on the supporter. The cover covers the supporter and the camera units. The lens driving mechanism includes a base, a pivoting component and a fixer. The base is disposed on the supporter. The pivoting component is disposed on the base. The fixer has a top surface and two supporting surfaces connected with each other. The supporting surfaces are used to support the camera units. The fixer includes a connective block disposed on a side of the supporting surface opposite to the top surface. The pivoting component is rotatably assembled with the connective block, so the fixer can rotate relative to the base and the camera units can be moved synchronously.

14 Claims, 10 Drawing Sheets

LENS DRIVING MECHANISM AND RELATED CAMERA DEVICE

BACKGROUND OF THE INVENTION

1. Field of the Invention

The present invention relates to a lens driving mechanism and a camera device, and more particularly, to a lens driving mechanism and a camera device capable of simultaneously driving motion of a plurality of camera units.

2. Description of the Prior Art

A conventional panoramic camera apparatus utilizes the fish-eye lens to capture a panoramic image. A field of view of the fish-eye lens can reach a super wide viewing angle of one hundred and eighty degrees. Some pattern positioned on a center of the panoramic image can maintain its original form, and other pattern positioned near to an edge of the panoramic image may be distorted and unable to show the original form. As the fish-eye lens is applied to the monitoring apparatus, the edge of the panoramic image cannot provide accurate image information due to distortion. Another conventional panoramic camera apparatus utilizes multiple non-fisheye lenses (which are ordinary lens) to capture several monitoring images, and the monitoring images can be stitched to form the panoramic image. However, the field of view of the ordinary lenses cannot achieve one hundred and eighty degrees, so that a support frame of the panoramic camera apparatus has to be varied for adjusting orientations of the ordinary lenses, and then the image with the demanded field of view can be acquired accordingly. Thus, design of a new-typed camera apparatus capable of using the ordinary lenses to capture the undistorted image without adjustment of the support frame is an important issue in the related monitoring industry.

SUMMARY OF THE INVENTION

The present invention provides a lens driving mechanism and a camera device capable of simultaneously driving motion of a plurality of camera units for solving above drawbacks.

According to the claimed invention, a lens driving mechanism for simultaneously driving motion of a plurality of camera units can include a base, a pivoting component and a fixer. The pivoting component is disposed on the base. The fixer has a top surface and two supporting surfaces connected with each other. An angle formed between planar normal vectors of the two supporting surfaces is not an obtuse angle. The two supporting surfaces are respectively connected to two opposite sides of the top surface and used to respectively support the plurality of camera units. The fixer includes a connection block, which has a locking structure disposed on a side of at least one supporting surface opposite to the top surface. The pivoting component is connected to the connection block via the locking structure in a rotatable manner for allowing rotation between the fixer and the base.

According to the claimed invention, a camera device can include a supporter, a plurality of camera units, a cover and a lens driving mechanism. The plurality of camera units is movably disposed on the supporter. The cover is adapted to cover the supporter and the plurality of camera units. The lens driving mechanism can simultaneously drive motion of the plurality of camera units. The lens driving mechanism includes a base, a pivoting component and a fixer. The base is disposed on the supporter. The pivoting component is disposed on the base. The fixer has a top surface and two supporting surfaces connected with each other. An angle formed between planar normal vectors of the two supporting surfaces is not an obtuse angle. The two supporting surfaces are respectively connected to two opposite sides of the top surface and used to respectively support the plurality of camera units. The fixer includes a connection block, which has a locking structure disposed on a side of at least one supporting surface opposite to the top surface. The pivoting component is connected to the connection block via the locking structure in a rotatable manner for allowing rotation between the fixer and the base.

The lens driving mechanism of the present invention disposes the fixer on the base via the pivoting component. The angle between the two supporting surfaces of the fixer can be preferably equal to ninety degrees. The camera units are respectively locked onto the corresponding supporting surface, so that line-of-sight of the two camera units respectively disposed on the two supporting surfaces can be perpendicular to each other. Disparity angle of the two camera units can be accurate because the camera units with different line-of-sight are disposed on the same fixer. The camera units, which are not fish-eye lenses, of the camera device are disposed on the same rotary shaft, such as the fixer, for simultaneous rotation. Lenses of the two camera units are near because the camera units are positioned on the same fixer and can be helpful to image stitching process.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
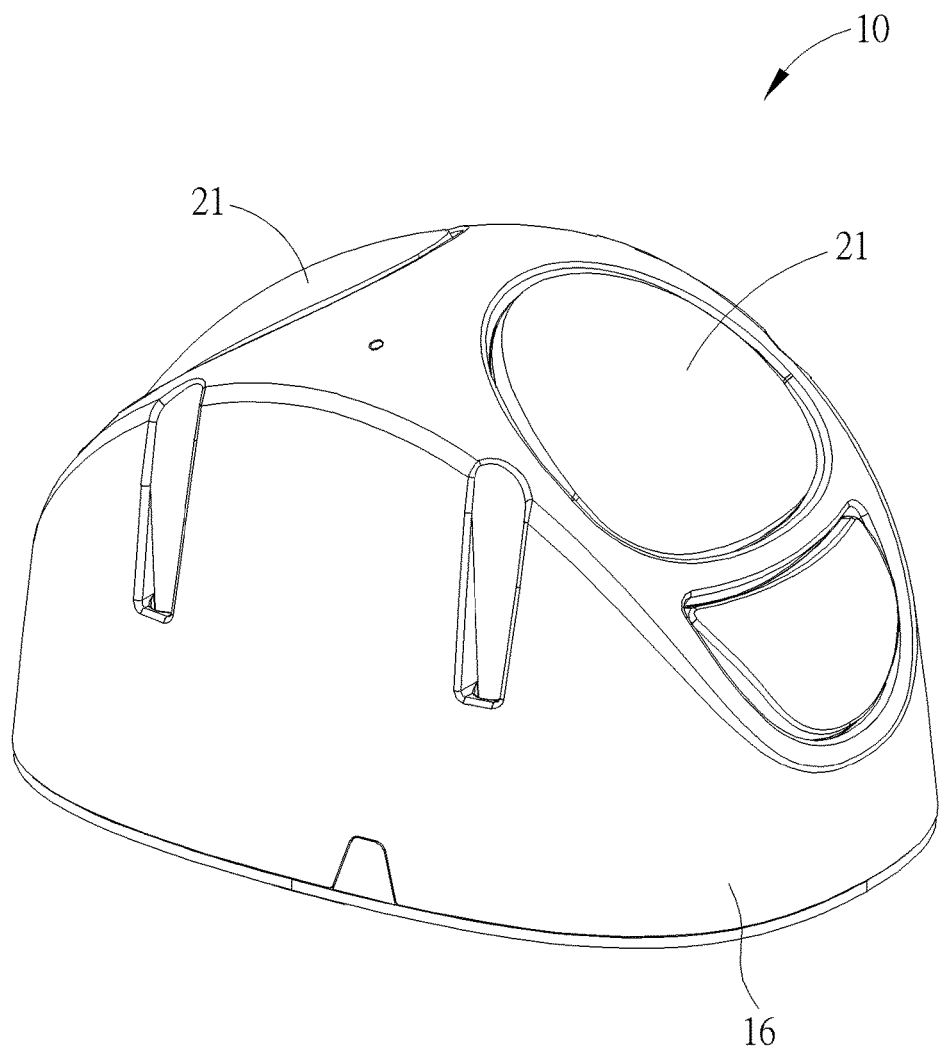
FIG. 1 is a diagram of a camera device according to an embodiment of the present invention.
Figure 2:
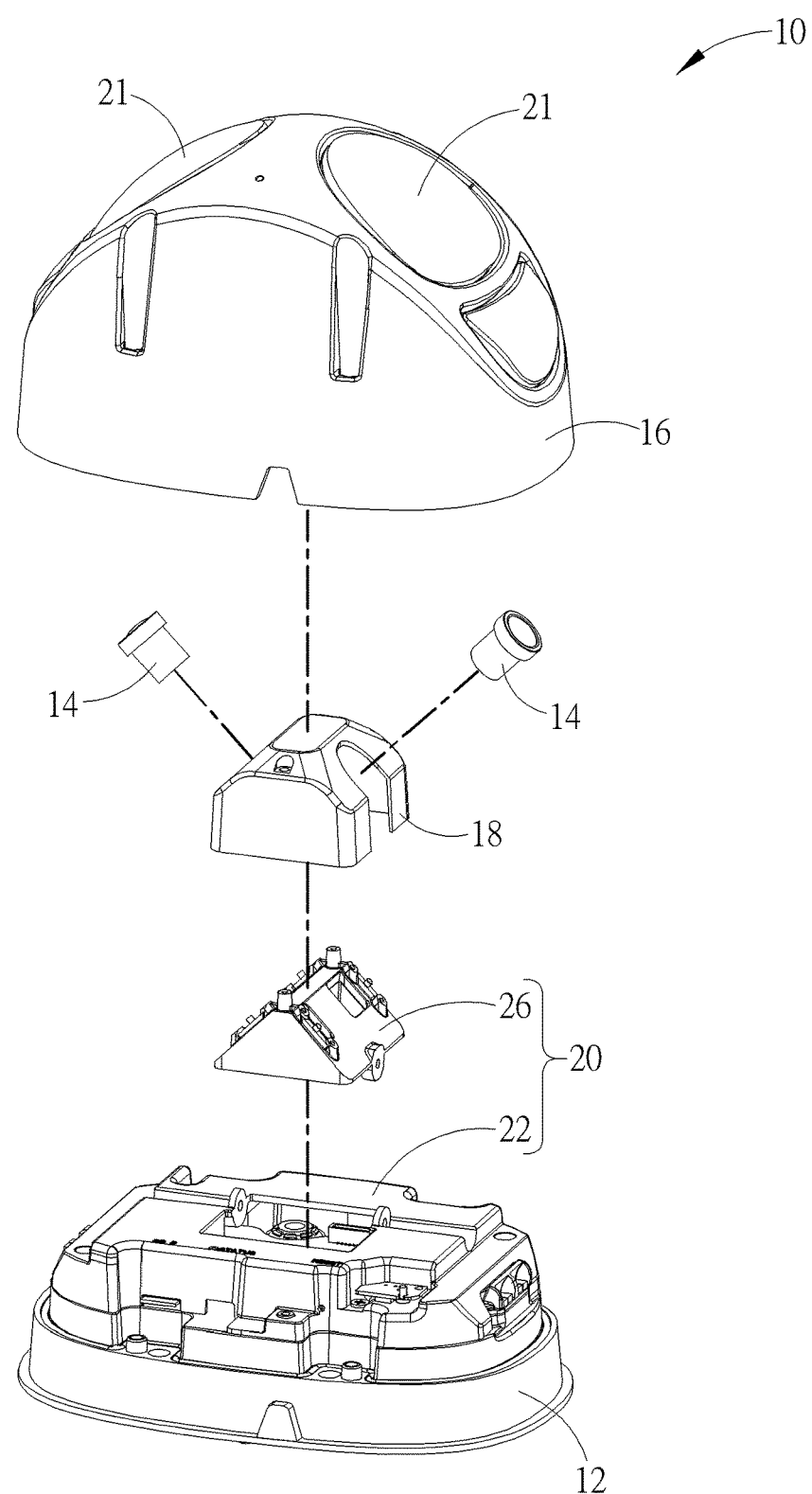
FIG. 2 is an exploded diagram of the camera device according to the embodiment of the present invention.

Please refer to FIG. 1 and FIG. 2. FIG. 1 is a diagram of a camera device 10 according to an embodiment of the present invention. FIG. 2 is an exploded diagram of the camera device 10 according to the embodiment of the present invention. The camera device 10 can include a supporter 12, a camera unit 14, a cover 16, an upper lid 18 and a lens driving mechanism 20. An amount of the camera unit 14 is plural, and the plurality of camera units 14 is respectively disposed on corresponding positions of the lens driving mechanism 20. The upper lid 18 can be assembled with the lens driving mechanism 20. The camera unit 14 can pass through an opening of the upper lid 18 from an inner side to an outer side. The lens driving mechanism 20 is disposed on the supporter 12. The camera units 14 can be simultaneously moved relative to the supporter 12 via the lens driving mechanism 20. The cover 16 can directly cover the camera units 14 and the lens driving mechanism 20, and be assembled with the supporter 12 to provide waterproof and dustproof functions. A plurality of transparent components 21 can be disposed on the cover 16; therefore, the camera unit 14 can capture images through the transparent components 21 when being disposed inside the cover 16.

Figure 3:
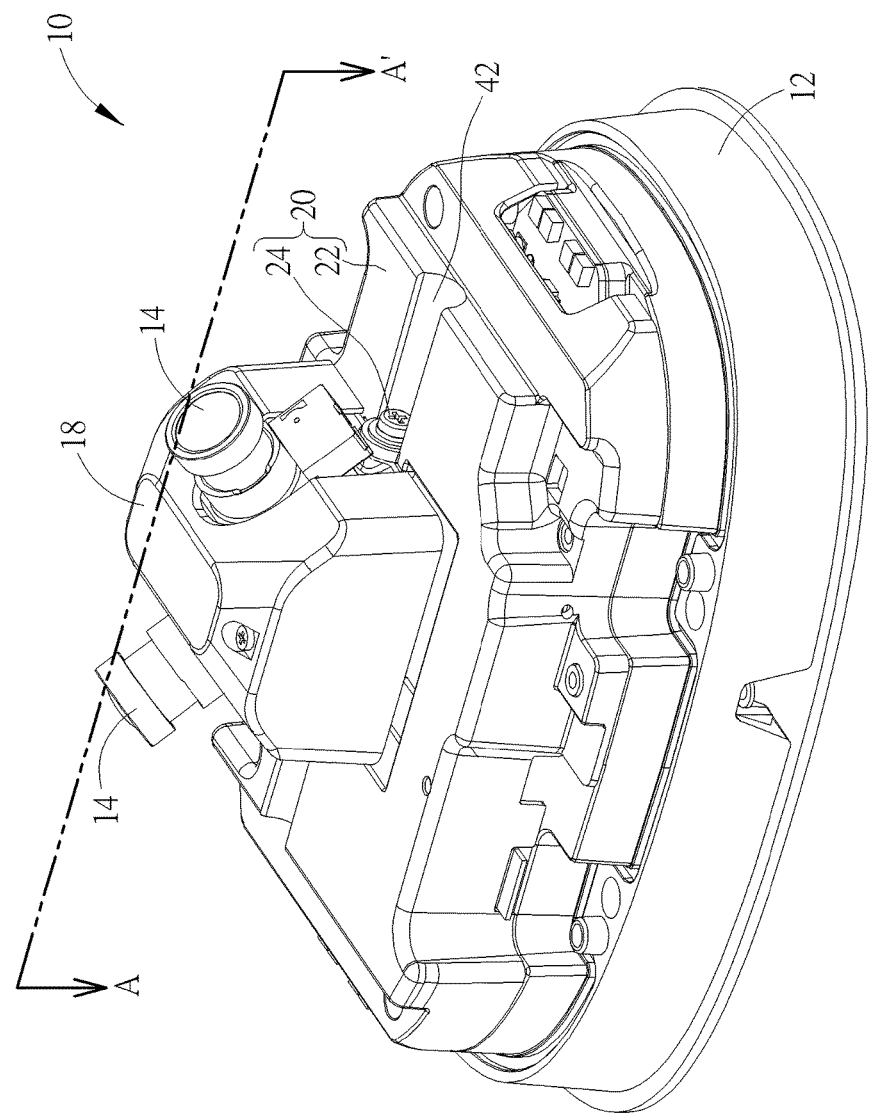
FIG. 3 is a diagram of the camera device without the cover according to the embodiment of the present invention.
Figure 4:
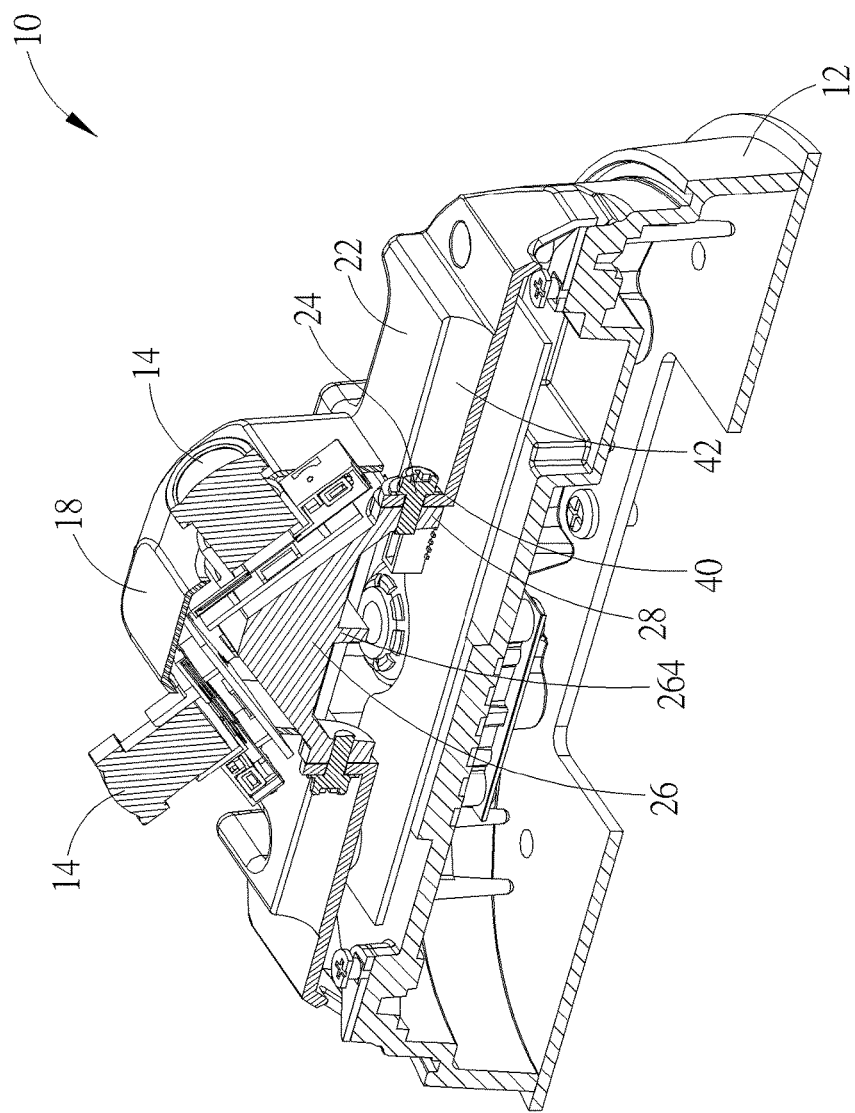
FIG. 4 is a sectional view of the camera device along the line A-A' shown in FIG. 3.
Figure 5:
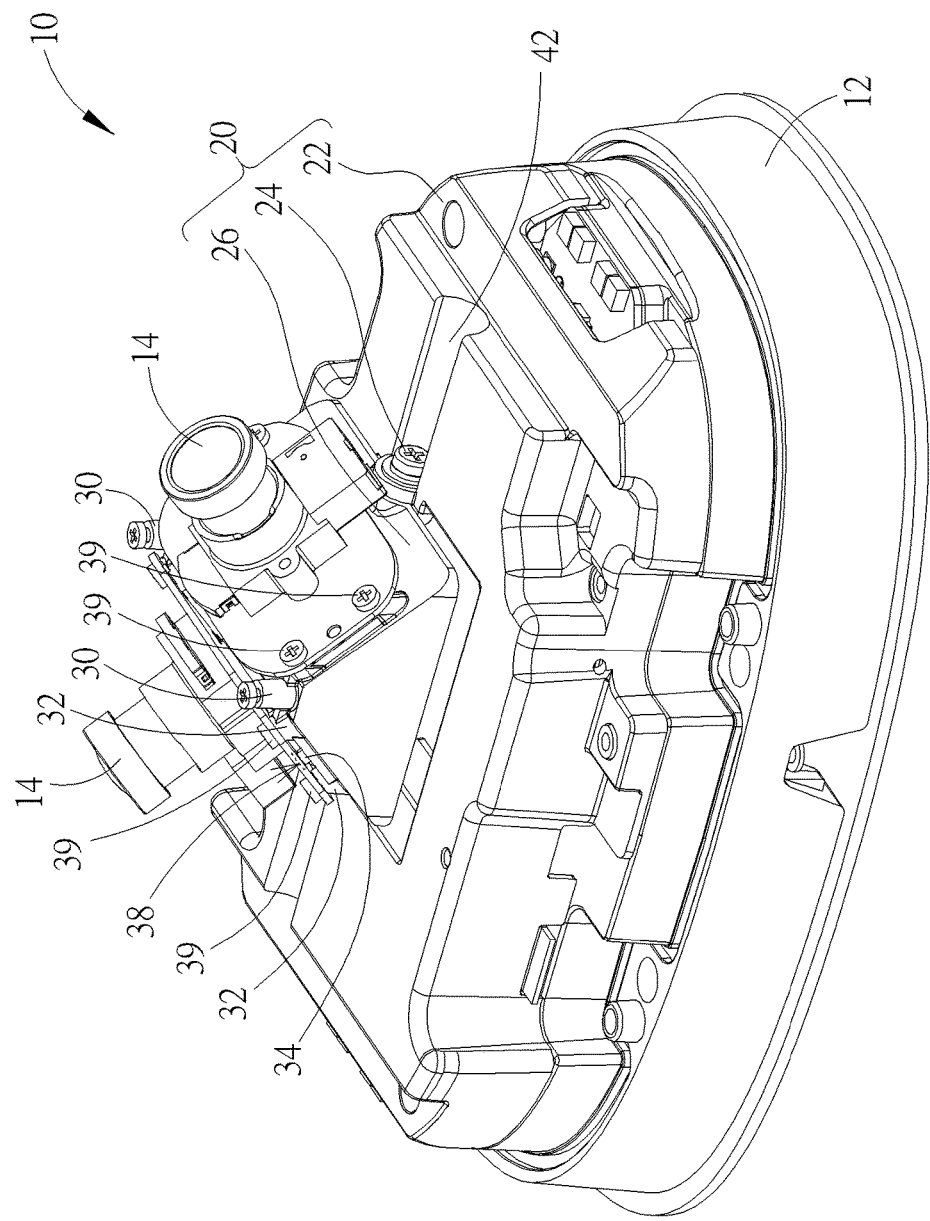
FIG. 5 is an assembly diagram of the camera device without the cover and the upper lid according to the embodiment of the present invention.
Figure 6:
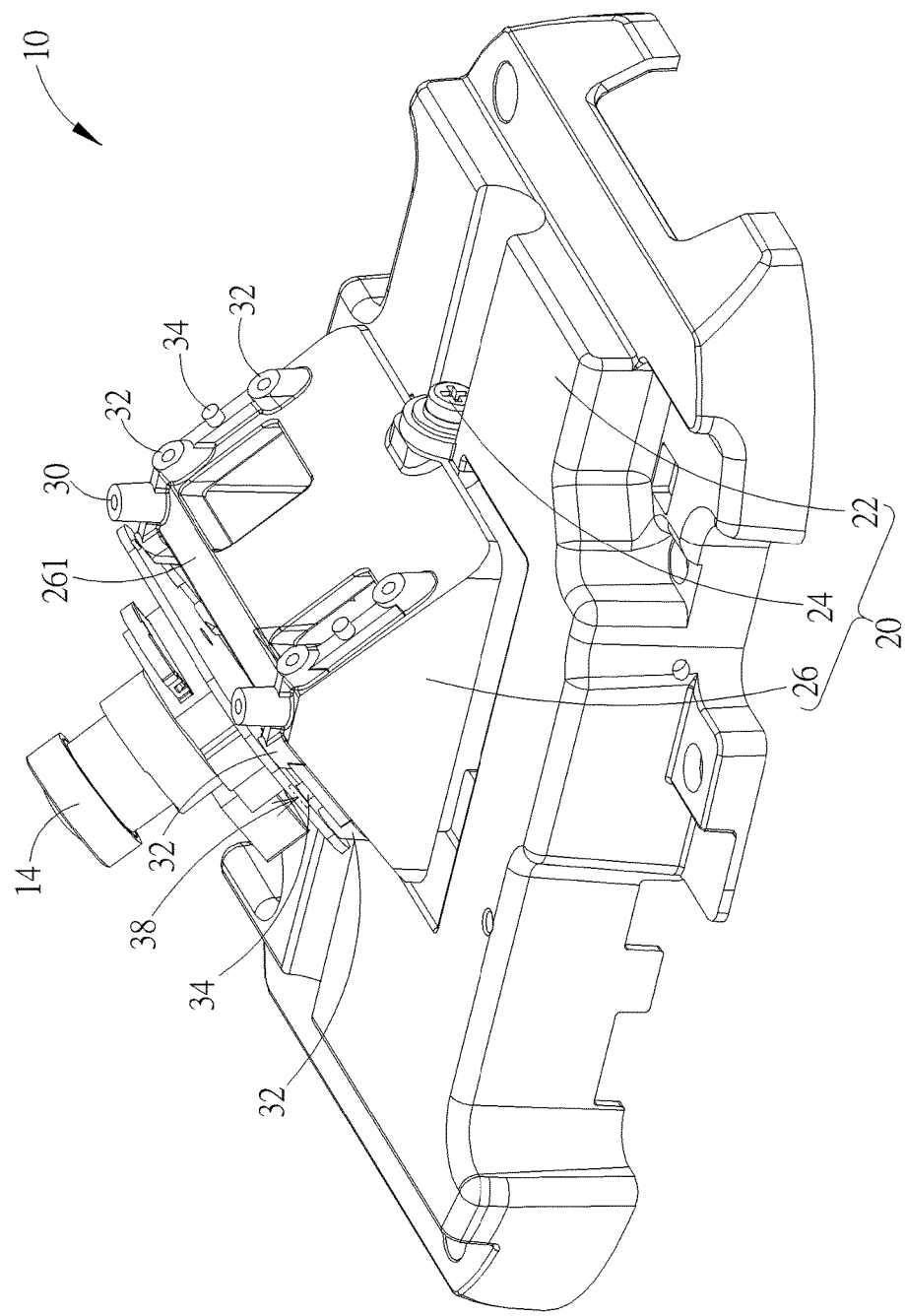
FIG. 6 is an assembly diagram of the lens driving mechanism according to the embodiment of the present invention.
Figure 7:
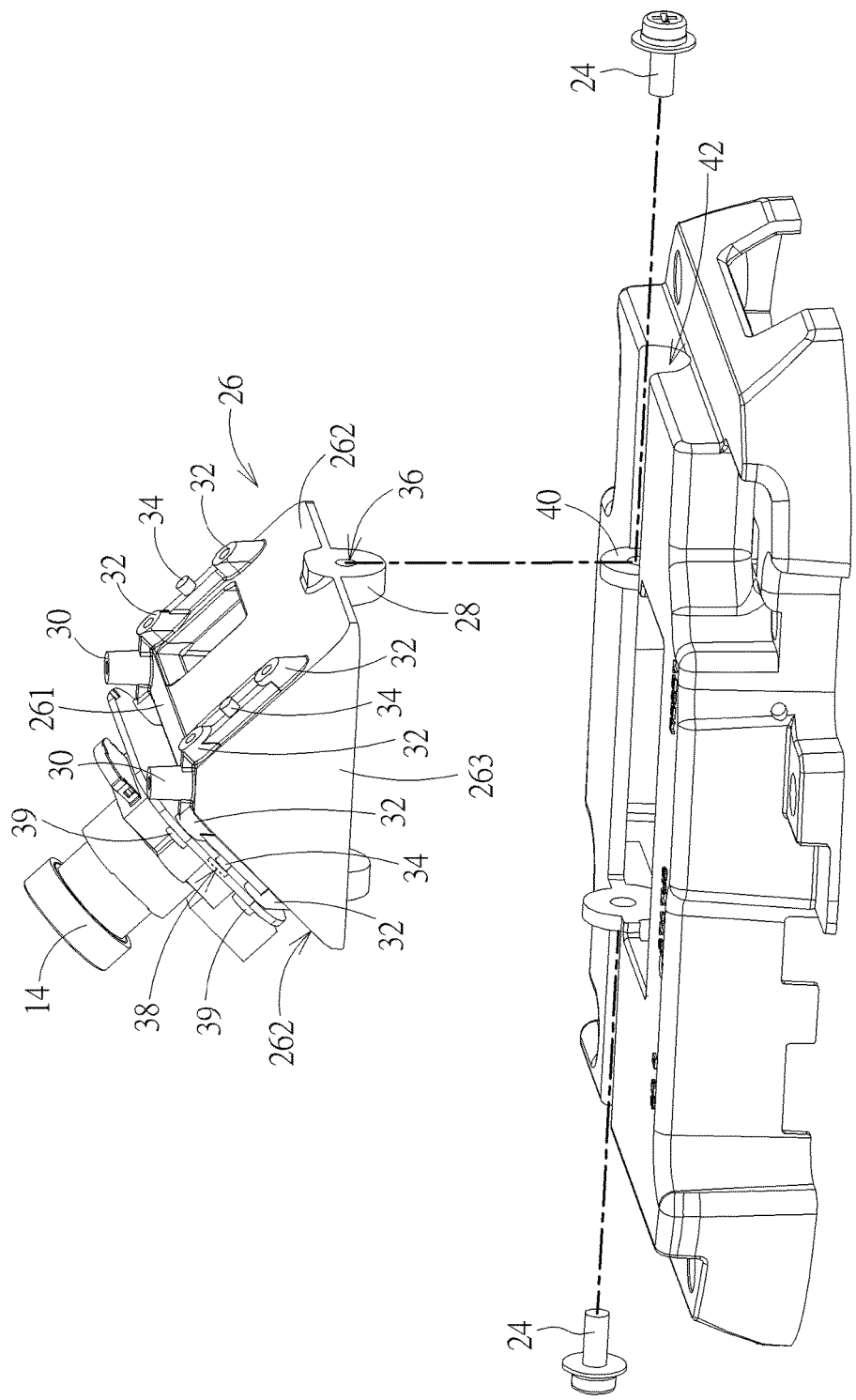
FIG. 7 is an exploded diagram of the lens driving mechanism according to the embodiment of the present invention.
Figure 8:
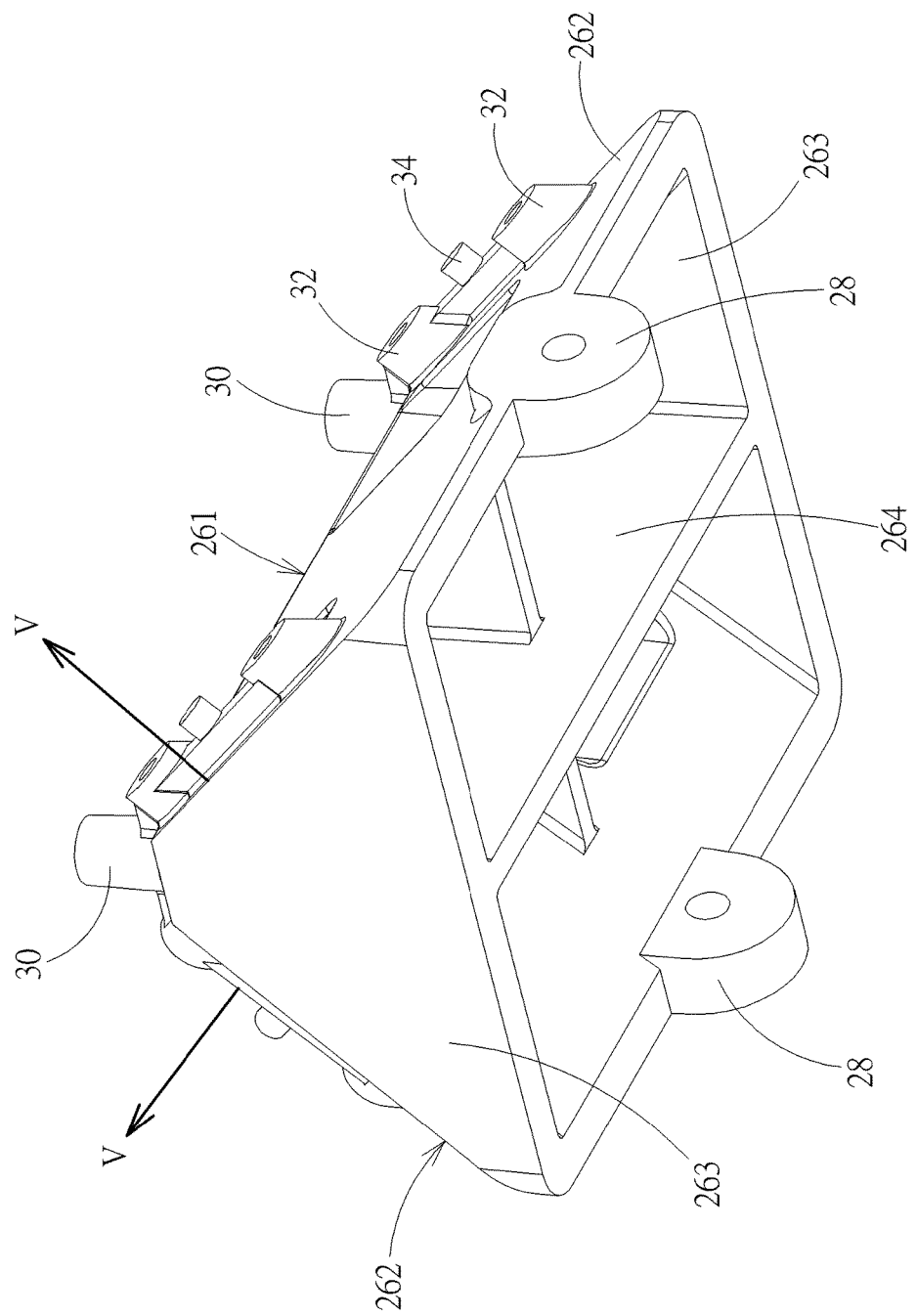
FIG. 8 is another view of a fixer of the lens driving mechanism according to the embodiment of the present invention.

Please refer to FIG. 3 to FIG. 8. FIG. 3 is a diagram of the camera device 10 without the cover 16 according to the embodiment of the present invention. FIG. 4 is a sectional view of the camera device 10 along the line A-A' shown in FIG. 3. FIG. 5 is an assembly diagram of the camera device 10 without the cover 16 and the upper lid 18 according to the embodiment of the present invention. FIG. 6 is an assembly diagram of the lens driving mechanism 20 according to the embodiment of the present invention. FIG. 7 is an exploded diagram of the lens driving mechanism 20 according to the embodiment of the present invention. FIG. 8 is another view of a fixer 26 of the lens driving mechanism 20 according to the embodiment of the present invention. In this embodiment, the lens driving mechanism 20 can include a base 22, a pivoting component 24 and the fixer 26. The base 22 is disposed on the supporter 12. The fixer 26 is disposed on the base 22 via the pivoting component 24 in a rotatable manner. The fixer 26 can be used to support the camera units 14. When the fixer 26 is rotated relative to the base 22, the camera units 14 disposed on the fixer 26 can be moved accordingly.

As shown in FIG. 7 and FIG. 8, the fixer 26 can include a top surface 261, two supporting surfaces 262, two lateral surfaces 263 and a rib structure 264 connected to each other. Two supporting surfaces 262 are respectively connected to two opposite sides of the top surface 261. Two lateral surfaces 263 are respectively connected to other opposite sides of the top surface 261 different from the supporting surface 262. The rib structure 264 is disposed between the lateral surfaces 263. The fixer 26 can be empty for decreasing its weight. The rib structure 264 is designed to increase structural strength of the fixer 26. An angle formed between a planar normal vector V of one supporting surface 262 and a planar normal vector V of another supporting surface 262 preferably cannot be an obtuse angle, which means the foresaid angle can be an acute angle or a right angle. In this embodiment, the planar normal vectors V of the supporting surfaces 262 are perpendicular to each other, and an actual application is not limited to the above-mentioned embodiment. The two supporting surfaces 262 are adapted to respectively support the two camera units 14 pointing toward different orientations.

The fixer 26 can include a connection block 28, a first locking portion 30, a second locking portion 32 and a positioning portion 34. The connection block 28 is disposed on a side of the supporting surface 262 opposite to the top surface 261. The connection block 28 has a locking structure 36 where the pivoting component 24 can be locked. The first locking portion 30 is disposed on the top surface 261 for locking the upper lid 18. The supporting surface 262 can support the camera unit 14, and the second locking portion 32 and the positioning portion 34 can be disposed on the supporting surface 262. A structural height of the positioning portion 34 may be higher than a structural height of the second locking portion 32, so that the positioning portion 34 can be engaged with a positioning hole structure 38 of the positioning portion 34 for locating the camera unit 14 onto the fixer 26 and further preventing the camera unit 14 from unexpected malposition; accordingly, the second locking portion 32 can be locked later easily. As the camera unit 14 is positioned on the fixer 26 via the positioning portion 34 and the positioning hole structure 38, the second locking portion 32 can be locked with a locking unit 39 of the camera unit 14, and the camera unit can be assembled with the fixer 26 stably.

The base 22 can include a hole structure 40 and a slot structure 42. A position of the slot structure 42 corresponds to the connection block 28 of the fixer 26. The hole structure 40 is disposed on an end of the slot structure 42 adjacent to the connection block 28. The pivoting component 24 can pass through the hole structure 40 via the slot structure 42, and utilize the hole structure 40 to assemble with the locking structure 36 of the connection block 28 in the rotatable manner. The upper lid 18 can be forced to rotate the lens driving mechanism 20 relative to the supporter 12, which means the plurality of camera units 14 can be inclined forward or backward at the same time. In this embodiment, the pivoting component 24 can insert into the hole structure 40 through the slot structure 42, and then assembled with the locking structure 36 of the connection block 28 through the hole structure 40 in the rotatable manner; however, an actual application is not limited to the above-mentioned embodiment. For example, as the connection block 28 is put on the hole structure 40, the pivoting component 24 can insert into the locking structure 36 of the connection block 28 through the slot structure 42, and then assembled with the hole structure 40 in the rotatable manner.

Figure 9:
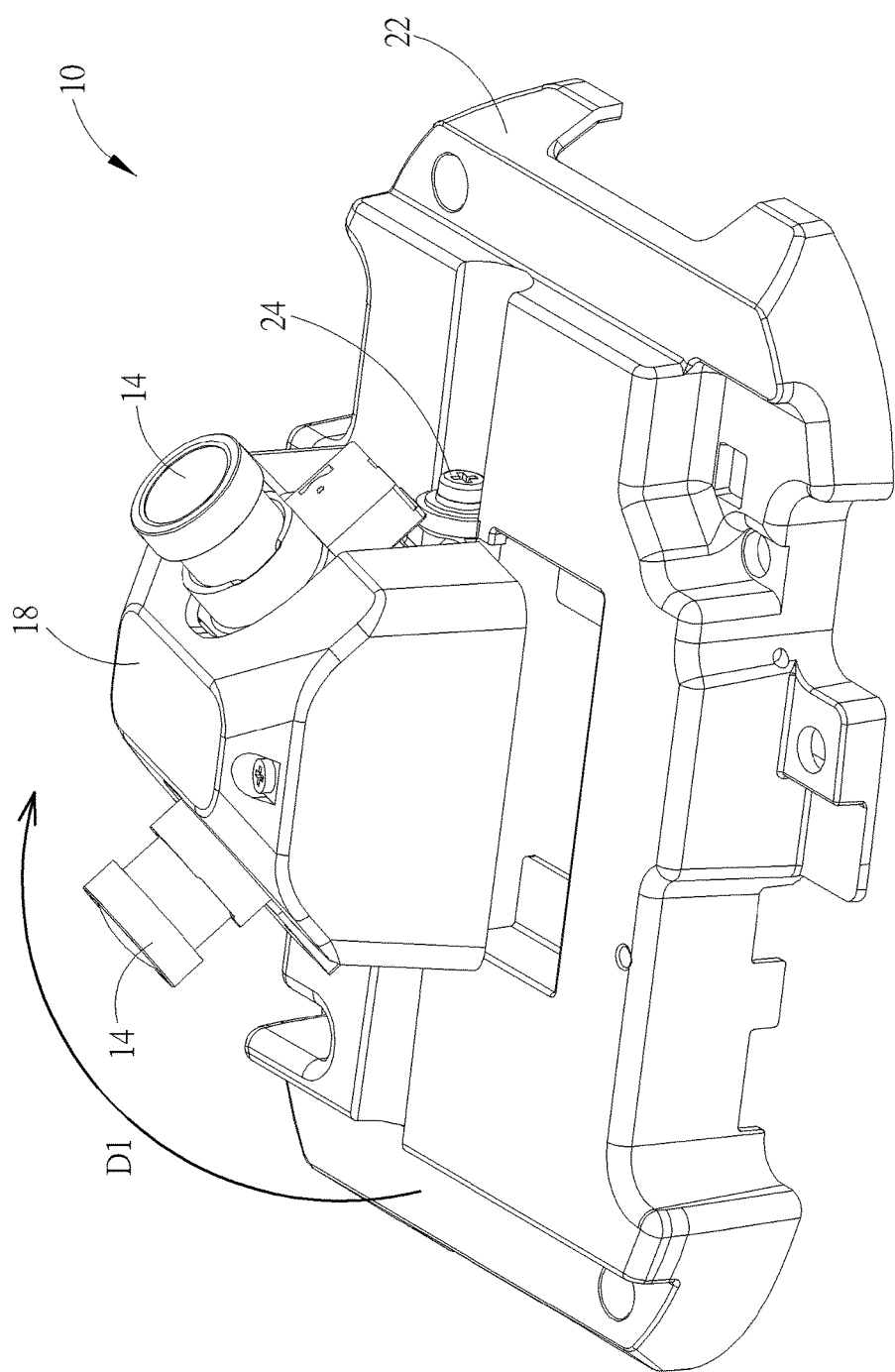
FIG. 9 and FIG. 10 respectively are diagrams of the camera device in different modes according to the embodiment of the present invention.
Figure 10:
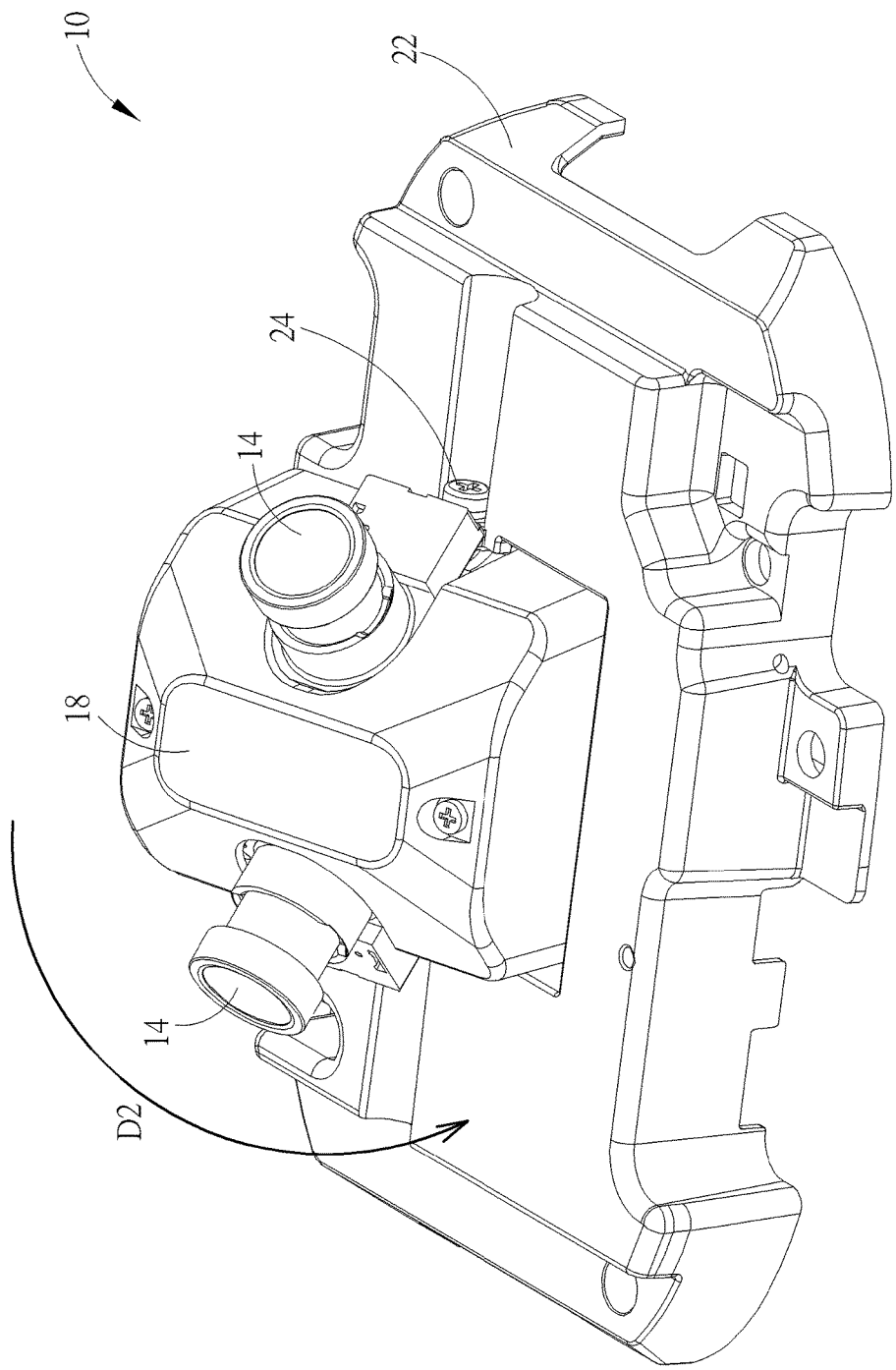

Please refer to FIG. 3, FIG. 9 and FIG. 10. FIG. 9 and FIG. 10 respectively are diagrams of the camera device 10 in different modes according to the embodiment of the present invention. The fixer 26 can be rotated relative to the base 22 in directions D1 and D2 by passing the pivoting component 24 through the hole structure 40 and the connection block 28. The upper lid 18 is fixed onto the fixer 26. When the user intends to adjust rotation of the camera unit 14, the cover 16 can be removed for a start, and the upper lid 18 can be manually pushed to rotate the fixer 26 and the camera units 14 via the pivoting component 24. Generally, the pivoting component 24 can be a screw or a bolt. Any components capable of providing locking and rotating functions belong to a scope of the pivoting component 24 in the present invention.

The lens driving mechanism of the present invention disposes the fixer on the base via the pivoting component. The angle between the two supporting surfaces of the fixer can be preferably equal to ninety degrees. The camera units are respectively locked onto the corresponding supporting surface, so that line-of-sight of the two camera units respectively disposed on the two supporting surfaces can be perpendicular to each other. Disparity angle of the two camera units can be accurate because the camera units with different line-of-sight are disposed on the same fixer. The camera units (which are not fish-eye lenses) of the camera device are disposed on the same rotary shaft (such as the fixer) for simultaneous rotation. Lenses of the two camera units are near because the camera units are positioned on the same fixer and can be helpful to image stitching process.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lens driving mechanism for simultaneously driving motion of a plurality of camera units, the lens driving mechanism comprising:
   a base;
   a pivoting component disposed on the base; and
   a fixer, the fixer having a top surface and two supporting surfaces connected with each other, an angle formed between planar normal vectors of the two supporting surfaces being not an obtuse angle, the two supporting surfaces being respectively connected to two opposite sides of the top surface and used to respectively support the plurality of camera units, the fixer comprising:
      a connection block, the connection block having a locking structure disposed on a side of at least one supporting surface opposite to the top surface, the pivoting component being connected to the connection block via the locking structure in a rotatable manner for allowing rotation between the fixer and the base.

2. The lens driving mechanism of claim 1, wherein the planar normal vectors of the two supporting surfaces are perpendicular to each other.

3. The lens driving mechanism of claim 1, wherein the base comprises a hole structure, and the pivoting component passes through the hole structure to connect with the connection block.

4. The lens driving mechanism of claim 1, wherein the fixer further comprises a first locking portion disposed on the top surface and adapted to lock an upper lid.

5. The lens driving mechanism of claim 1, wherein the fixer further comprises a second locking portion and a positioning portion disposed on each of the two supporting surfaces, the second locking portion is adapted to lock a corresponding camera unit, the positioning portion is adapted to engage with a positioning hole structure of the corresponding camera unit, and a structural height of the second locking portion is smaller than a structural height of the positioning portion.

6. The lens driving mechanism of claim 1, wherein the fixer further has two lateral surfaces respectively disposed on two opposite sides of the top surface different from the two supporting surfaces, and the fixer further comprises a rib structure disposed between the two lateral surfaces.

7. The lens driving mechanism of claim 1, wherein the base has a slot structure corresponding to the connection block of the fixer, and the pivoting component is connected with the connection block through the slot structure.

8. A camera device, comprising:
   a supporter;
   a plurality of camera units movably disposed on the supporter;
   a cover adapted to cover the supporter and the plurality of camera units; and
   a lens driving mechanism for simultaneously driving motion of the plurality of camera units, the lens driving mechanism comprising:
      a base disposed on the supporter;
      a pivoting component disposed on the base; and
      a fixer, the fixer having a top surface and two supporting surfaces connected with each other, an angle formed between planar normal vectors of the two supporting surfaces being not an obtuse angle, the two supporting surfaces being respectively connected to two opposite sides of the top surface and used to respectively support the plurality of camera units, the fixer comprising:
         a connection block, the connection block having a locking structure disposed on a side of at least one supporting surface opposite to the top surface, the pivoting component being connected to the connection block via the locking structure in a rotatable manner for allowing rotation between the fixer and the base, so as to simultaneously drive the motion of the plurality of camera units.

9. The camera device of claim 8, wherein the planar normal vectors of the two supporting surfaces are perpendicular to each other.

10. The camera device of claim 8, wherein the base comprises a hole structure, and the pivoting component passes through the hole structure to connect with the connection block.

11. The camera device of claim 8, wherein the fixer further comprises a first locking portion disposed on the top surface and adapted to lock an upper lid.

12. The camera device of claim 8, wherein the fixer further comprises a second locking portion and a positioning portion disposed on each of the two supporting surfaces, the second locking portion is adapted to lock a corresponding camera unit, the positioning portion is adapted to engage with a positioning hole structure of the corresponding camera unit, and a structural height of the second locking portion is smaller than a structural height of the positioning portion.

13. The camera device of claim 8, wherein the fixer further has two lateral surfaces respectively disposed on two opposite sides of the top surface different from the two supporting surfaces, and the fixer further comprises a rib structure disposed between the two lateral surfaces.

14. The camera device of claim 8, wherein the base has a slot structure corresponding to the connection block of the fixer, and the pivoting component is connected with the connection block through the slot structure.

* * * * *